Dec. 8, 1959     B. DEMTCHENKO     2,915,976
GEAR PUMPS
Filed Jan. 27, 1953     4 Sheets-Sheet 1
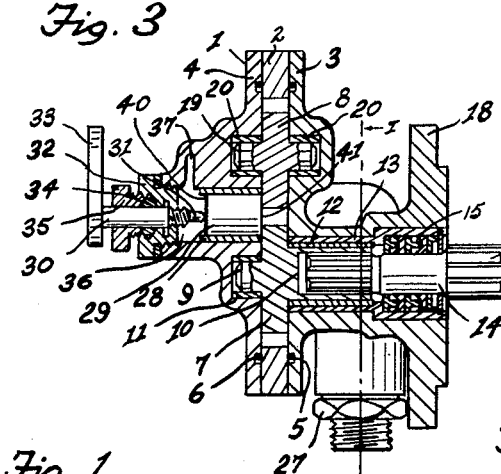
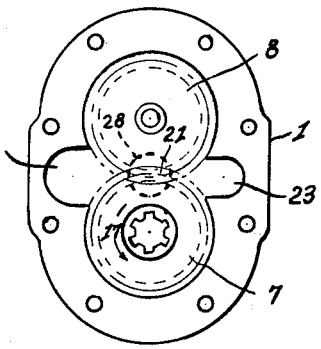
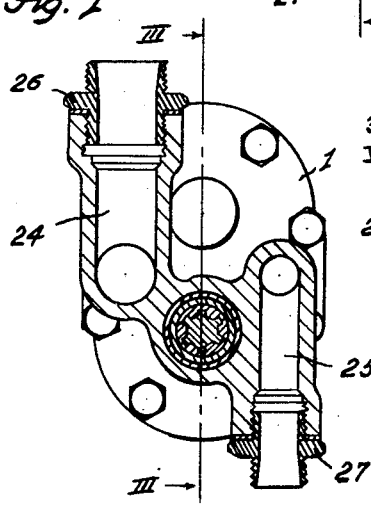
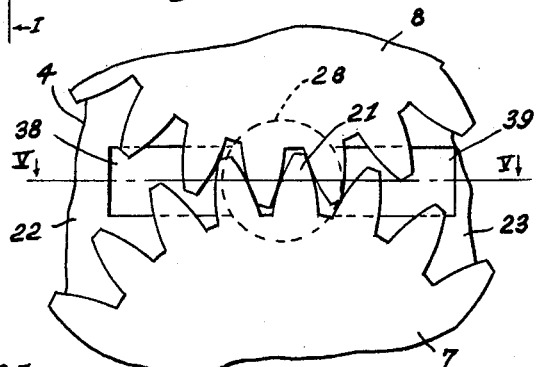
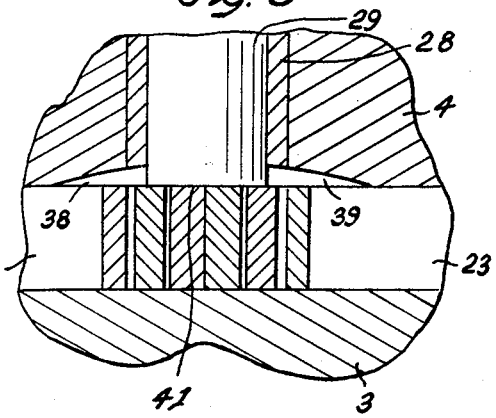
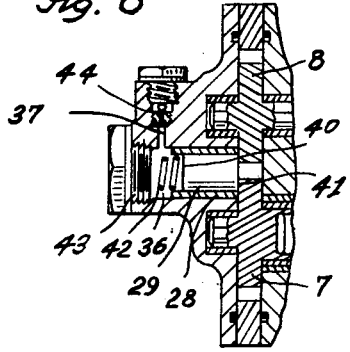
INVENTOR.
Basile Demtchenko
BY
ATTORNEY

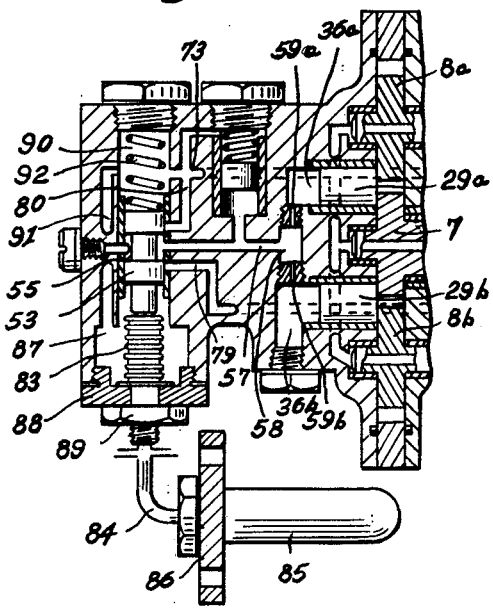
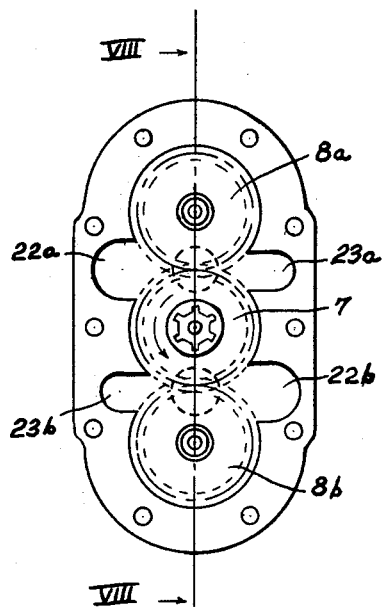
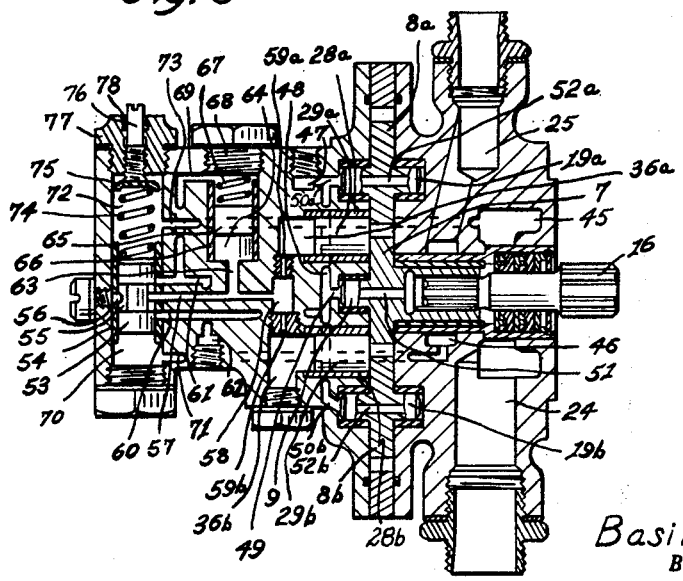

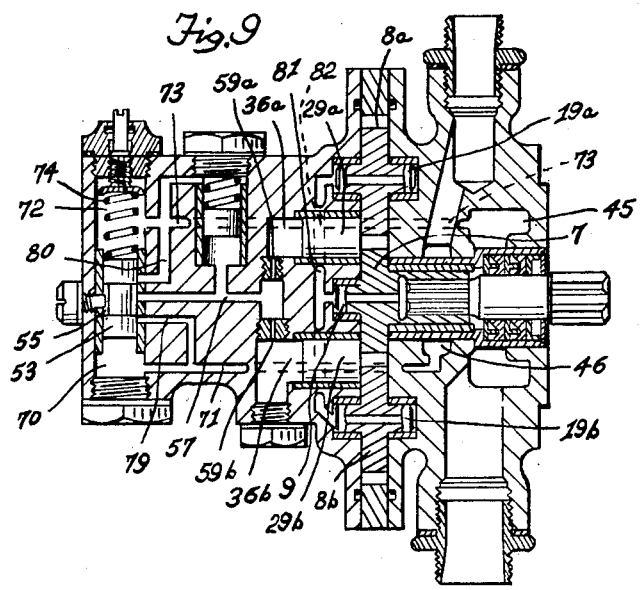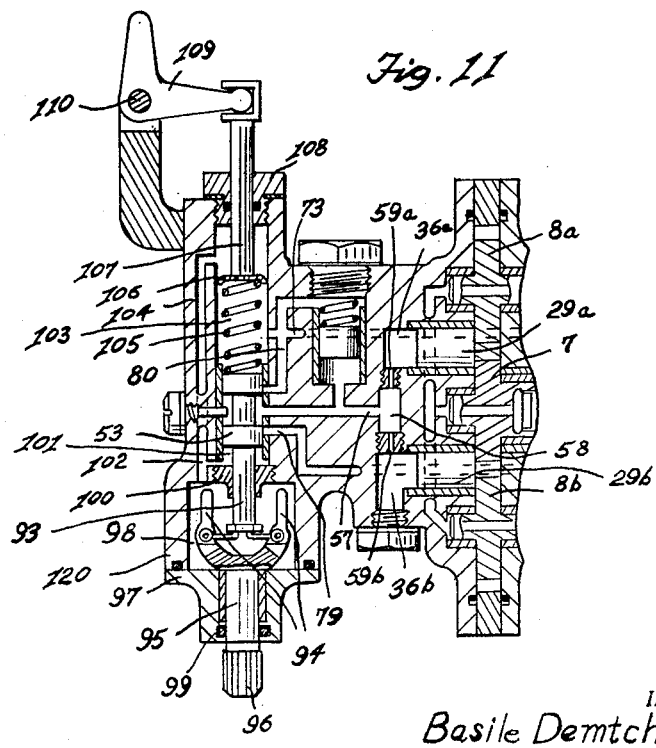

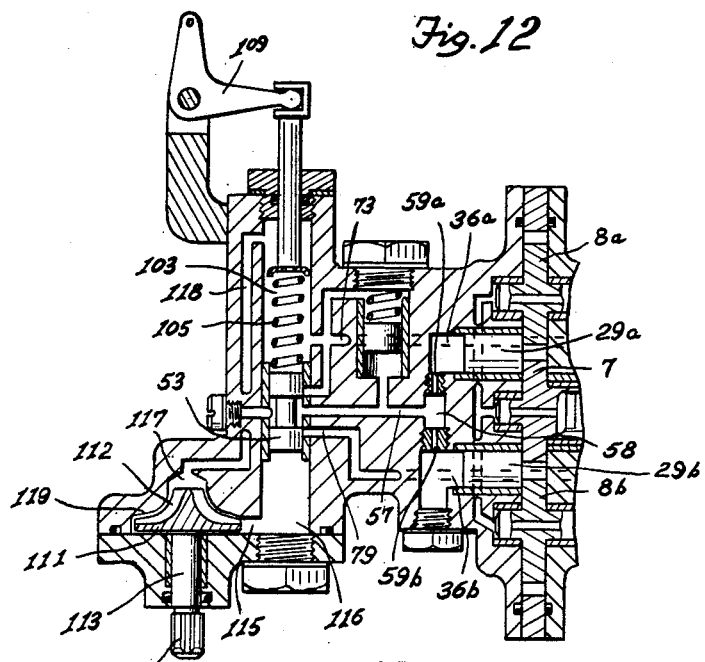
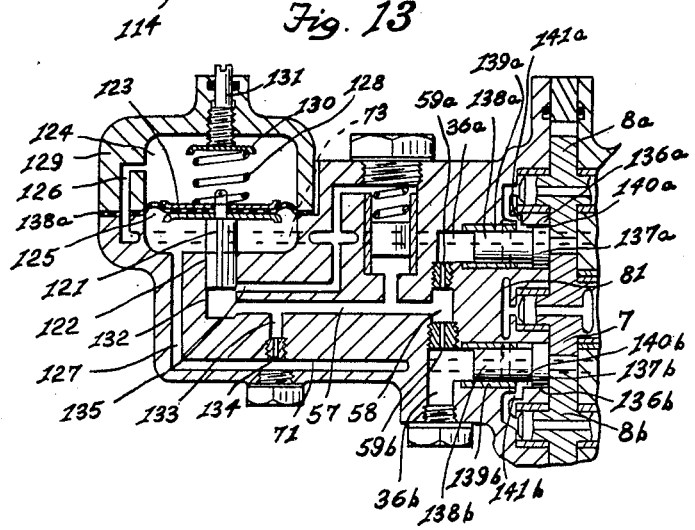
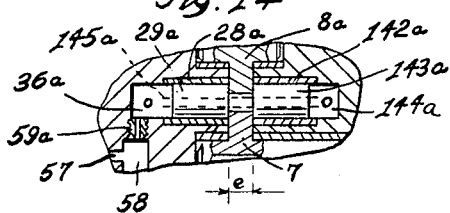
INVENTOR.
Basile Demtchenko
BY
ATTORNEY

United States Patent Office 2,915,976
Patented Dec. 8, 1959

2,915,976

GEAR PUMPS

Basile Demtchenko, Issy-les-Moulineaux, France, assignor to Societe du Carburateur Zenith, Lyon, France Application January 27, 1953, Serial No. 333,530

Claims priority, application France February 1, 1952

3 Claims. (Cl. 103—41)

The present invention relates to a gear pump with variable delivery and to its applications, mainly to combustion apparatus and chiefly to motors such as internal combustion engines, gas turbines and the like.

The invention has for its object to produce a gear pump with variable delivery in a simple manner and with compact volume. It also has for its object to allow of precision regulation of the pump output. It has for a further object to reduce the mechanical forces to which the various members of the pump are subjected and, in consequence, to diminish the wear of the latter.

The present application has further for object various applications of a gear pump according to the invention. It provides, mainly, a pump control so disposed as to keep the pressure of discharge of the latter constant, a pump control functioning according to the conditions of temperature in a combustion apparatus fed by the said pump, and a pump control functioning according to the speed of an engine fed by the said pump.

A gear pump according to the invention comprises a pair of pinions in engagement rotating in a casing and defining in said casing, on both sides of the zone of penetration of the teeth of said pinions, a suction chamber and a delivery chamber; a cylindrical housing disposed in one of the side walls of said casing and opening into the latter opposite to the zone of penetration of the teeth of said pinions forms a by-pass between said suction chamber and said delivery chamber, whilst a piston sliding in said cylindrical housing and of which the position is adjustable, regulates the section of passage of said by-pass so as to reduce said section of passage and to increase the delivery of the pump when the said piston approaches said pinions, and to increase said section of passage and to reduce the delivery of the pump when said piston recedes from said pinions.

Preferably, said cylindrical housing communicates freely with said suction chamber and with said delivery chamber through two recesses made in the inner face of said side wall and extending distinctly beyond the zone of penetration of the teeth of said pinions.

In one form of embodiment according to the invention, said piston is loaded by a spring tending to return it towards said pinions, whereby the pump is self-regulating, that is to say that its delivery is automatically adapted to the requirements of the apparatus which it feeds.

In a preferred form of embodiment according to the invention, said piston is controlled by an hydraulic servo-control. Said hydraulic servo-control may employ as motive fluid for example lubricating oil under pressure employed for lubricating the pump or the fluid under pressure discharged by the pump itself.

Said piston can be connected to a movable wall of a pressure chamber which communicates with a source of motive fluid under pressure and with a discharge conduit through two passages of which one at least is adjusted by the pilot member of the servo-control.

Said movable wall may be formed by the end of said piston itself, opposite to the end of this latter which faces said pinions, or indeed by a second piston sliding in a cylinder forming said pressure chamber, said second piston being connected to the first piston.

In order to stabilize the position of the piston regulating the by-pass of the pump, said pressure chamber can be connected by an orifice of small section to an intermediate conduit which communicates with a source of motive fluid under pressure and with a discharge conduit by two passages of which one at least is adjusted by the pilot member of the servo-control.

In order to avoid too rough a control of the piston adjusting the by-pass of the pump, said pressure chamber can communicate with the chamber of a shock-absorber which has a movable wall loaded by a spring, the chamber of said shock-absorber being connected, either directly to said pressure chamber or to the aforesaid intermediate conduit.

Gear pumps very frequently comprise a master pinion engaging with several secondary pinions, each pair formed by the master pinion and one of the secondary pinions constituting an elementary pump, so that the total output of the pump is formed by the sum of the outputs of said elementary pumps. In such a pump, the output of each elementary pump may be adjusted, as mentioned above, by means of a piston sliding in a cylindrical housing disposed in one of the side walls of the pump casing and opening into the latter opposite to the zone of penetration of the teeth of the two pinions forming said elementary pump.

In order to increase the delivery of gear pumps, wide pinions are usually employed. It may be of advantage, in such a case, to associate, with each cylindrical housing disposed in one of the side walls of the pump casing a cylindrical housing of similar nature disposed in the other side wall and in which slides a piston controlled in the same way as the piston sliding in the first cylindrical housing.

When the pump comprises several pistons adjusting a by-pass, all said pistons may be controlled by a servo-control comprising a pressure chamber associated with each of said pistons and having a movable wall connected to said piston, the various pressure chambers being connected to an intermediate common conduit which communicates with a source of active fluid under pressure and with a discharge conduit through two passages of which one at least is adjusted by the pilot member of said servo-control.

The control by a servo-control of one or more pistons adjusting a by-pass in the pump allows of easily adapting the latter to the various applications thereof which may be made.

If it is desired to embody a constant pressure pump, the pilot member of the servo-control may be controlled by the delivery of the pump so as to bring into action said servo-control in the direction of increasing or of decreasing the output of the pump according as said pressure of discharge is below or above a given value.

The pilot member of said servo-control may be controlled by the differential action of the delivery pressure of the pump and of a reference pressure to which is added the force of a spring, said reference pressure being for example the suction pressure of the pump.

When the pump feeds with fuel a combustion apparatus such as for example a boiler burner or an engine and it is desired so to adjust the output of the pump as to maintain a given temperature at a point of the said combustion apparatus, the servo-control may be actuated as a function of the temperature prevailing at this point so as to reduce the output of the pump when said temperature rises, and to increase the delivery of the pump when said temperature falls.

When the pump feeds an engine with fuel and it is desired to keep the engine speed equal to a predetermined reference speed, the pilot member of the servo-control may be controlled as a function of the speed of said engine so as to bring into action said servo-control in the direction of increasing or of diminishing the output of the pump according as said speed is below or above said reference speed. The pump can comprise a device for altering said reference speed.

In the drawings:

Fig. 1 illustrates, in partial elevational section along the line I—I, Fig. 3, a gear pump according to the invention.

Fig. 2 illustrates the same pump in elevation, the front plate being assumed to be removed.

Fig. 3 illustrates the same pump in section along the line III—III, Fig. 1.

Fig. 4 illustrates, on a larger scale, a detail of Fig. 2, and

Fig. 5 illustrates the same detail in section along the line V—V, Fig. 4.

Fig. 6 illustrates, in vertical section, a modification of of a part of the pump illustrated in Figs. 1 to 5.

Fig. 7 illustrates, in elevation, a pump with three pinions, the front plate being assumed to be removed.

Fig. 8 illustrates in vertical section the same pump along the line VIII—VIII, Fig. 7.

Figs. 9 to 13 illustrate, in vertical section, various modifications of embodiment of a part of the pump illustrated in Figs. 7 and 8.

Fig. 14 illustrates, in vertical section, a modification of a detail common to the various pumps illustrated in Figs. 7 to 13.

In the various figures, the same members are designated by the same reference numerals.

In one and the same figure relating to a pump with several elements, similar members are designated by the same reference numerals, distinguished if necessary by indices.

The pump illustrated in Figs. 1 to 5 comprises a casing 1 (Fig. 3) formed by a body part 2 and two cheek-plates 3 and 4. Fluidtightness between the cheek-plates 3 and 4 and the body part 2 is ensured by means of suitable gaskets 5 and 6.

Two pinions 7 and 8 in engagement are disposed in casing 1. Pinion 7 is integral with a spindle 9—10 of which the two opposite parts 9 and 10 rotate respectively in bearings 11 and 12. Bearing 12 is kept in place by means of a sleeve 13 fitted into cheek-plate 3. Part 10 of the spindle of pinion 7 is coupled to an intermediate driving spindle 14 rotating in a joint system 15 which ensures fluid-tightness. Intermediate spindle 14 comprises a channelled end 16 allowing of driving said spindle and pinion 7 in the direction of arrow 17 (Fig. 2) by an engine (not illustrated) whereon the pump may be mounted by means of a flange 18.

Pinion 8 is integral with a spindle 19 for rotating in bearings 20. Pinion 8 is driven by pinion 7.

Bearings 11, 12 and 20 are made of a suitable material to avoid seizing of spindles 9—10 and 19. They may for example be of graphite.

Pinions 7 and 8 define in casing 1 of the pump, on both sides of the zone 21 of penetration of the teeth of said pinions, a suction chamber 22 and a discharge chamber 23 (Fig. 2). Suction and discharge chambers 22, 23 communicate respectively with a suction duct 24 and a discharge duct 25 (Fig. 1). Suction duct 24 is connected by means of a junction member 26 with the source of feed of the pump (not illustrated), whilst discharge duct 25 is connected by means of a connecting member 27 with the apparatus fed by the pump (not illustrated).

According to the invention, a cylindrical housing 28 is disposed in cheek-plate 4 of the casing and opens into the interior of said casing opposite to the zone 21 of penetration of the teeth of pinions 7 and 8. Said cylindrical housing is formed by a sleeve which is for example graphite, fitted into cheek-plate 4. Cylindrical housing 28 forms a by-pass between discharge chamber 23 and suction chamber 22. The section of passage of said by-pass is adjusted by a piston 29 sliding in cylindrical housing 28. The disposition of the teeth of pinions 7, 8 of cylindrical housing 28 and of piston 29 is clearly shown in Figs. 4 and 5, which will be described more in detail later on.

The position of piston 29 is adjusted by means of a spindle 30 against the extremity 31 of which there rests the face 40 of said piston opposite to the face 41 of the latter facing the zone of penetration of the teeth of pinions 7 and 8. A stopper 32 is screwed into the cheek-plate 4. Spindle 30 is itself screwed into stopper 32 and may be manipulated by means of a lever 33. A packing 34 tightened by a bolt 35 traversed by spindle 30, ensures fluid-tightness around said spindle. The base 36 of cylindrical housing 28 is connected by a conduit 37, of which only one part is visible in Fig. 3, to suction chamber 22 (Fig. 2).

If cylindrical housing 28 has a large enough diameter entirely to cover the zone 21 of penetration of the teeth of pinions 7 and 8 (which is not the case in the drawing), said cylindrical housing directly establishes communication between discharge chamber 23 and suction chamber 22. In gear pumps, the teeth of the pinions are usually high enough, because the output of the pump is as much the greater as the teeth are higher. The two pinions then have several teeth in engagement and the zone of penetration of the teeth of the pinions is extensive enough. In order to avoid giving very large dimensions to housing 28, the diameter of said housing is chosen, as illustrated in the drawing, so that it only covers a part of the zone of penetration of the teeth of the pinions and said cylindrical housing is connected with suction chamber 22 and discharge chamber 23 by two recesses 38 and 39 (Figs. 4 and 5) formed in the inside face of cheek-plate 4 and are freely extended beyond the zone 21 of penetration of the teeth of the pinions. Thus, cylindrical housing 28 communicates freely with suction chamber 22 and discharge chamber 23.

The apparatus operates as follows:

Pinion 7 rotating in the direction of arrow 17 drives pinion 8 in the opposite direction, whereby the liquid fed to suction chamber 22 through conduit 24 is transported by pinions 7 and 8 towards delivery chamber 23 connected to output conduit 25. If the face 41 of pinion 49 is substantially in contact with pinions 7 and 8, as illustrated in the drawing, the by-pass between discharge chamber 23 and suction chamber 22, formed by recess 39, cylindrical housing 28 and recess 38, is closed by piston 29, and all the liquid transported by the pinions is discharged towards conduit 25 with the exception of leakages.

Even when piston 29 is substantially in contact with pinions 7 and 8, there is always a slight leakage from recess 39 towards recess 38 under said piston, so that the latter is subjected to a pressure intermediate between the pressures prevailing respectively in discharge chamber 23 and suction chamber 22. As the pressure prevailing in the base 36 of cylindrical housing 28 is equal to the pressure prevailing in suction chamber 22, transmitted by conduit 37, the face 40 of piston 29 is subjected to a pressure less than the pressure which is exerted on the face 41 of said piston and piston 29 tends always to be applied against the end 31 of rod 30.

When lever 32 is so manipulated as to unscrew spindle 30 relative to stopper 32, the end 31 of said spindle is displaced towards the left and piston 29 follows the end 31 in this movement. The face 41 of the piston aforesaid recedes thus from pinions 7 and 8 and opens the by-pass between discharge chamber 23 and suction chamber 22. A certain quantity of liquid returns to discharge chamber 23, through recess 39, the passage provided between pinions 7 and 8 and piston 29, and recess 38, towards suction chamber 22 and the delivery of the pump decreases. The manipulation of lever 33 allows therefore of adjusting the output of the pump.

More precisely, the liquid comprised between the teeth of pinions 7 and 8 in the region of penetration of the teeth of said pinions adjacent to discharge chamber 23 is sent directly into the by-pass and it is sucked directly from said by-pass between the teeth of said pinions into the region of penetration of the teeth of said pinions adjacent to suction chamber 22. The liquid which returns from discharge chamber 23 towards suction chamber 22 therefore traverses a very short path and thus avoids harmful stirring-up of the liquid which is produced in ordinary pumps provided with a by-pass lying externally between the discharge chamber and the suction chamber and which results in a substantially heating of the pump and of the liquid. Furthermore, the lamination of the liquid between the teeth of the pinions is largely avoided, since the liquid returning to the suction chamber is sent directly into the by-pass along the generatices of the teeth of the pinions instead of having to travel between the teeth of said pinions to reach the free region of the delivery chamber and, thence, an external by-pass. The arrangement according to the invention thus decreases the forces on the teeth and on the spindles of the pinions which result from this lamination and decreases, in consequence, the wear of the pump.

In the modification illustrated in Fig. 6, piston 29 is loaded by a spring 42 comprised between the face 40 of said piston and a stopper 43 closing the chamber 36 formed by the base of cylindrical housing 28. In the conduit 37 connecting chamber 36 with the suction chamber of the pump there is placed an orifice 44 of small cross-section.

The pump thus embodied is self-adjusting. The face 41 of piston 29 is subjected to a pressure intermediate between the suction pressure and the delivery pressure of the pump, whilst its face 40 is subjected to the suction pressure of the pump transmitted to chamber 36 through conduit 37, increased by the force of spring 42.

If the pressure exerted on the face 41 of piston 29 is greater than the suction pressure exerted on the face 40 of said piston, increased by the force of spring 42, piston 29 is displaced towards the left so as further to open the by-pass between the delivery chamber and the suction chamber of the pump. The output of the pump decreases, which gives rise to a drop in the delivery pressure of the pump and, in consequence, in the pressure exerted on the face 41 of piston 29 and this latter comes to rest when the delivery pressure of the pump is such that the forces exerted on the two faces of piston 29 are in equilibrium.

On the contrary, if the pressure exerted on the face 41 of piston 29 is less than the suction pressure exerted on the face 40 of said piston, increased by the force of spring 42, piston 29 is displaced towards the right so as to reduce the cross-section of the passage of the by-pass and in consequence to increase the delivery of the pump and, at the same time, its delivery pressure. Piston 29 comes to rest when the pressure of delivery of the pump is such that the forces exerted on the two faces of said piston are in equilibrium.

The equilibrium of piston 29 corresponds to a substantially constant value of the delivery pressure of the pump or, more precisely, to a substantially constant value of the difference between the delivery pressure and the suction pressure of the pump. Whatever be the requirements of liquid of the apparatus fed by the pump, piston 29 therefore takes up a position such that the pressure of the pump remains substantially constant.

The orifice 44 of small cross-section placed in conduit 37 has for its object to slow down the movements of liquid between chamber 36 and suction chamber 22 of the pump and, thereby to damp the movements of piston 29.

The operation of the device illustrated in Fig. 6 is such that the difference between the pressure exerted on the face 41 of piston 29 and the reference pressure transmitted to chamber 36 balances the force of spring 42. The reference pressure transmitted to chamber 36 is not necessarily the suction pressure of the pump and any other appropriate pressure can be chosen as reference pressure. For example, in internal combustion engines, it is often of advantage, for the various auxiliary apparatus of the engine, to take as reference pressure the induction pressure of the engine. If the pump illustrated in part in Fig. 6 feeds an internal combustion engine, conduit 37 can be connected to the induction pressure of the engine.

Figs. 7 and 8 illustrate a pump with three pinions of which the by-pass regulating pistons are servo-controlled.

The pump illustrated in Figs. 7 and 8 comprises a master pinion 7 gearing with two secondary pinions 8a and 8b. Master pinion 7 is driven by means of an intermediate shaft 16 under the same conditions as pinion 7 of the pump illustrated in Figs. 1 to 5.

The pump comprises two elementary pumps formed respectively by the pair of pinions 7 and 8a on the one hand and the pair of pinions 7 and 8b on the other hand. Each elementary pump comprises a suction chamber 22 and a discharge chamber 23 (Fig. 7). The two suction chambers 22a and 22b are connected, through passages not shown in the drawings, to an annular input collector 45 (Fig. 8) which itself is connected to suction conduit 24 of the pump. The two discharge chambers 23a and 23b are connected, through passages not illustrated in the drawings, to an annular discharge collector 46 which itself is connected to the delivery conduit 25 of the pump.

The output of each elementary pump is adjusted by means of a piston sliding in a cylindrical housing 28 forming a by-pass between discharge and suction chambers 23 and 22 relative to said elementary pump.

The two pistons 29a and 29b are controlled by an hydraulic servo-control employing as motive fluid the lubricating oil under pressure of the pump. The lubricating oil under pressure is led through a conduit not shown to an oil inlet 47 feeding a conduit 48. Conduit 48 communicates with the housings of spindles 9, 19a, 19b of pinions 7, 8a, and 8b through passages 49, 50a and 50b. Spindles 9, 19a and 19b are traversed by longitudinal channels 51, 52a and 52b, whereby the parts of said spindles situated on both sides of the corresponding pinions are suitably lubricated.

The servo-control comprises a pilot member formed by a slide valve 53 sliding in a cylinder 54. Slide valve 53 comprises a recess 55. An abutment 56 screwed in the body of the apparatus limits the displacement of slide valve 53 in cylinder 54. Recess 55 is connected permanently by a passage 57 to an intermediate conduit 58. Intermediate conduit 58 communicates through orifices 59a, 59b of small cross-section respectively with pressure chambers 36a and 36b formed by the base of cylindrical housings 28a, 28b. Slide valve 53 adjusts the communication of recess 55, on the one hand with a passage 60 for oil under pressure, and on the other hand with a discharge passage 61. Passage 60 is connected to conduit 48 for oil under pressure, whilst passage 61 is connected to an oil outlet 62 itself connected to a conduit (not shown) which forms a return passage to the suction of the lubricating pump.

Intermediate conduit 58 communicates through a passage 63 with chamber 64 of a shock-absorbing arrangement comprising a piston 65 sliding in a cylinder 66 and loaded by a spring 67 comprised between said piston and a stopper 68. The return pressure prevailing in passage 61 is transmitted to the upper face of piston 65 through a passage 69.

The lower end of slide valve 53 is subjected to the delivery pressure of the pump, transmitted from delivery collector 46 to chamber 70 situated below said slide valve, through a conduit 71. The upper end of slide valve 53 is subjected to the suction pressure of the pump, transmitted from suction collector 45 to chamber 72 situated above said slide valve, through a conduit 73. Slide valve 53 is loaded by a spring 74 comprised between the upper end of said slide valve and a cupola or cap 75 carried by a spindle 76. Spindle 76 comprises a threaded part which screws into a stopper 77. A ring seal 78 disposed in said stopper around the smooth part of spindle 76, ensures the fluid-tightness around said spindle. The tension of spring 74 may be adjusted by turning spindle 76.

The operation of the regulating device of the pump illustrated in Figs. 7 and 8 is as follows:

Slide valve 53 which forms the pilot member of the servo-control is subjected to the difference between the delivery and suction pressures of the pump, transmitted respectively to chambers 70 and 72. Said slide valve is in equilibrium in its neutral position when this difference in pressure balances the force of spring 74. Passage 60 for oil under pressure and discharge passage 61 are then closed by slide valve 53, and the whole formed by recess 55 of the slide valve, passage 57, intermediate conduit 58 and pressure chambers 36a and 36b is isolated. Pistons 29a and 29b, which form the motive members of the servo-control are at rest.

Orifices 59a and 59b of small cross-section have for their object to slow down the flow of oil between pressure chambers 36a and 36b on the one hand and intermediate conduit 58 on the other hand and, thence, to damp the oscillations which pistons 29a and 29b may take up and to stabilize said pistons.

If the delivery pressure of the pump increases in consequence of a decrease in the requirement of liquid by the apparatus fed by the pump or of an increase in speed of the pump or for any other reason, this increase in pressure is transmitted to chamber 70 and to the lower face of slide valve 53. Under the effect of this increase in pressure, said slide valve is displaced upwardly further compressing spring 74 and uncovering discharge passage 61. Said passage is thus placed in communication with recess 55 and passage 57. The pressure falls in said passage 57, intermediate conduit 58 and pressure chambers 36a and 36b. Under the effect of the pressure which is exerted under pistons 29a and 29b, which pressure is, it will be remembered, intermediate between the suction and delivery pressures of the pump, said pistons are repulsed towards the left and drive the oil contained in pressure chambers 36a and 36b towards oil outlet 62 through intermediate conduit 58, passage 57, recess 55 and discharge passage 61. During this movement, said pistons 29a and 29b further open the by-passes which they control, which gives rise to a fall in output of the pump and a fall in delivery pressure of the latter.

The movements of pistons 29a and 29b is stopped when the delivery pressure of the pump has recovered its balance value for which the difference between the delivery and suction pressures acting on slide valve 53 balances the force of spring 74. Said slide valve has then returned to its neutral position, for which pressure passage 60 and discharge passage 61 are both closed, the whole comprising recess 55, passage 57, intermediate conduit 58 and pressure chambers 36a and 36b being isolated anew.

On the contrary, if the delivery pressure of the pump decreases as a result of an increase in the demand for liquid of the apparatus fed by the pump or of a decrease in the speed of the pump or for any other reason, this decrease in pressure is transmitted to chamber 70 and to the lower face of slide valve 53. As a consequence of this decrease in pressure, said slide valve is displaced downwardly under the effect of the force of spring 74 and uncovers passage 60 for oil under pressure. Said passage is thus placed in communication with recess 55 and passage 57. The lubricating oil under pressure coming from oil inlet 47 flows towards pressure chambers 36a and 36b through conduit 48, passage 60, recess 55, passage 57, intermediate conduit 58 and orifices 59a, 59b of small cross-section and pushes back pistons 29a and 29b towards the right. During this movement, said pistons further close the bypasses which they control, which gives rise to an increase in output of the pump and an increase in delivery pressure of the latter. The movement stops when the delivery pressure of the pump has regained its equilibrium value.

If the pressure of the lubricating oil is high, which is the case when the delivery pressure of the pump is high, since the pressure of the lubricating oil should always be greater than the pressure of the pump, the sharp transmission of this high pressure to pistons 29a and 29b, when slide valve 53 uncovers passage 60 for oil under pressure, would have harmful effects. It would produce, in particular, jolts in the various conduits and jerky variations in output of the pump. These harmful effects are avoided by piston 65 of the shock-absorber, loaded by spring 67. When slide valve 53 uncovers passage 60 for oil under pressure, the oil pressure is transmitted from passage 57 to chamber 64 of the shock-absorber arrangement and pushes back piston 65 against the force of spring 67, whereby variations in pressure in passage 57 and pressure chambers 36a and 36b which communicate with it are damped. Chamber 64 of the shock-absorbing arrangement, instead of being connected to intermediate conduit 58, can communicate directly with pressure chambers 36a and 36b or indeed these two chambers could be connected to two distinct shock-absorbing arrangements.

The servo-control of the pump illustrated in Figs. 7 and 8 therefore regulates the output of the pump so that the delivery pressure of the pump remains substantially constant, or, more precisely, the difference between the delivery pressure and the suction pressure of the pump remains substantially constant.

Instead of taking as reference pressure the suction pressure of the pump, there may be taken as reference pressure any other suitable pressure. It would suffice, to this end, to omit passage 73 which connects chamber 72 to suction collector 45 and to connect said chamber 72 to the chosen reference pressure. For example, if the pump feeds with fuel an internal combustion engine and it is desired to take as reference pressure the induction pressure of the said engine, chamber 72 will have to be connected to the said induction pressure.

The servo-control of the pump illustrated in Figs. 7 and 8 employs as motive fluid the lubricating oil under pressure of the pump. There could also be employed equally well as motive fluid any other fluid under pressure. To this end, it would suffice to connect the inlet 47 to the source of fluid under pressure which has been chosen and the outlet 62 to an appropriate discharge conduit, and to omit passages 49, 50a and 50b, which, in the arrangement illustrated in Fig. 8, were intended to ensure the lubrication of the spindles of the pinions of the pump. This lubrication will then be ensured by an independent circuit or indeed will not exist. If, in particular, the pump is a fuel pump, it is often useless to provide lubrication by oil under pressure, the fuel itself having sufficient lubricating qualities for such lubrication to be dispensed with.

In order to operate the servo-control of the pump, there may be employed as motive fluid the fluid under pressure supplied by the pump itself. This modification has been illustrated in Fig. 9.

The pump illustrated in Fig. 9 differs from the pump illustrated in Figs. 7 and 8 in the following points:

Slide valve 53 regulates the communication of recess 55 with a passage 79 for liquid under pressure, and with a discharge passage 80. Pressure passage 79 communicates with a conduit 71 connecting chamber 70 to delivery collector 46. Discharge passage 80 communicates with conduit 73 connecting chamber 72 with suction collector 45.

The housings of spindles 9, 19a and 19b of the pinions of the pump are connected to a conduit 81 communicating at 82 with return conduit 73. The low pressure created around the spindles by this arrangement allows a leakage to occur between the pinions and the housing of the pump towards said pinion axles and, thence, towards suction collector 45 through conduits 81 and 73. This leakage ensures a correct lubrication of the pinions and of their spindles when the liquid supplied to the pump has sufficient lubricating qualities.

The operation of the servo-control illustrated in Fig. 9 is identical with the operation of the servo-control illustrated in Fig. 8 except that the pressure of the lubricating oil therein is replaced by the delivery pressure of the pump itself.

In the pumps illustrated in Figs. 7 and 8 or in Fig. 9, the servo-control is operated as a function of the delivery pressure of the pump. Said servo-control could easily be operated as a function of any other suitable variable, and examples thereof are given in Figs. 10, 11 and 12.

In the pumps illustrated in Figs. 10, 11 and 12, the servo-control comprises, as in the pump illustrated in Fig. 9, a pilot member formed by a slide valve 53 adjusting the communication of recess 55 of said slide valve with a pressure passage 79 connected to the delivery collector of the pump, and with a discharge passage 80 connected to the suction collector of the pump. Recess 55 is in permanent communication with pressure chambers 36a and 36b through a passage 57, an intermediate conduit 58 and orifices 59a and 59b of small cross-section. The admission of liquid into pressure chambers 36a and 36b or its discharge from said chambers modifies the position of pistons 29a and 29b which adjust the section of passage of the by-passes of the pump and modifies consequently the output of the pump.

Thus, in the arrangements illustrated in Figs. 10, 11 and 12 as in the arrangement illustrated in Fig. 9, the output of the pump remains constant insofar as slide valve 53 is kept in its neutral position. It decreases if said slide valve is displaced upwardly and it increases if said slide valve is displaced downwardly.

The devices illustrated in Figs. 10, 11 and 12 can, of course, employ motive fluid other than the liquid under pressure delivered by the pump. This motive fluid could be for example the oil under pressure ensuring the lubricating of the pump as in the device illustrated in Figs. 7 and 8 or any other fluid under pressure. It would suffice, to this end, to connect passages 79 and 80 respectively to a source of fluid under pressure and to a suitable discharge orifice.

In the pump illustrated in Fig. 10, the servo-control is operated responsive to the conditions of temperature in a combustion apparatus fed with fuel by the pump. If, for example, the pump feeds with fuel a burner of a boiler furnace, the servo-control could be controlled responsive to the temperature of the water or steam of the boiler. The choice of the temperature responsive to which the servo-control is controlled forms no part of the invention, as only the mechanism of control responsive to said temperature is to be considered as part of the invention.

In the pump illustrated in Fig. 10, the pilot member of the servo-control formed by slide valve 53 is controlled responsive to the temperature prevailing at a suitable point of the apparatus fed with fuel by the pump, by means of a thermostat comprising a deformable capsule 83 connected by a conduit 84 to a bulb 85, the whole of bulb 85, conduit 84 and capsule 83 being filled with a suitable liquid.

Bulb 85 is fixed to a collar 86 which may be mounted on the apparatus (not illustrated) fed by the pump, at a suitable point so as to be subjected to the temperature responsive to which it is desired to adjust the output of the pump. Capsule 83 is disposed in a chamber 87 closed by a cap 88 on which is fixed said capsule by means of a screw 89. A chamber 90, separated from chamber 87 by slide valve 53, communicates with said chamber 87 by a passage 91 and is connected to the suction collector of the pump by conduit 73. Slide valve 53 is kept in contact with capsule 83 by means of a spring 92.

For a given temperature of bulb 85, slide valve 53 occupies its neutral position, pistons 29a and 29b remaining at rest and the output of the pump remaining constant.

If, for any reason, the temperature to which bulb 85 is subjected should rise, the liquid contained in said bulb expands, which gives rise to an elongation of capsule 83. Slide valve 73 is displaced upwardly and the output of the pump falls. Under the effect of this decrease in output, the temperature in the combustion apparatus fed by the pump drops and, in particular, the temperature to which bulb 85 is subjected decreases. Slide valve 53 returns to the neutral position and equilibrium is reestablished when the output of the pump has reached a value such that the temperature to which the bulb is subjected has regained its initial value.

On the contrary, if the temperature to which bulb 85 is subjected falls, the contraction of the liquid contained in said bulb gives rise to a shortening of capsule 83 and a downward movement of slide valve 53 which gives rise to an increase in the output of the pump. Slide valve 53 returns to the neutral position and balance is re-established when the output of the pump has reached a value such that the temperature to which bulb 85 is subjected has regained its initial value.

The pump illustrated in Fig. 11 is intended for feeding an engine with fuel, for example an internal combustion engine, a gas turbine or the like, the servo-control of the pump being operated responsive to the speed of said engine. If the engine is of such a type that the quantity of air admitted to the engine must be proportional to the quantity of fuel, as is the case for example with internal combustion engines with electric ignition, a device for adjusting the quantity of air supplied to the engine as a function of the output of fuel of the pump would have to be provided. Such an arrangement does not form part of the invention and has neither been described nor illustrated.

In the pump illustrated in Fig. 11, the pilot member of the servo-control formed by slide valve 53 is controlled by coupler 93 of a centrifugal governor 120 of which weights 94 are driven by a spindle 95 carrying a driving member 96. Driving member 96 is driven by the engine fed by the pump by means of a suitable transmission not illustrated. Spindle 95 rotates in a cylindrical bearing provided in a cover 97 closing chamber 98 wherein the weights of the governor are disposed. A ring seal 99 ensures fluidtightness between spindle 95 and its bearing. Coupler 93 of the governor is guided by a cap 100 closing chamber 101 situated below slide valve 53.

Chamber 98 of the governor communicates with chamber 103 situated above slide valve 53 through a conduit 104. Conduit 104 communicates, furthermore, with chamber 101 situated below slide valve 53 through a passage 102. Chamber 103 communicates with the suction collector of the pump through conduit 73. Thus the two ends of slide valve 53 are subjected to the same pressure, i.e. the suction pressure of the pump.

Slide valve 53 is loaded by a spring 105 comprised between said slide valve and a cupola or cap 106 carried by a rod 107. Rod 107 is guided in a stopper 108 and the tension of the spring can be adjusted by means of a lever 109 pivoting about an axis 110 and controlling the displacement of rod 107.

Slide valve 53 occupies its neutral position when, for this position, the speed of the engine is such that the centrifugal force of the weights of the governor, transmitted to said slide valve through coupler 93, balances the opposing force of the spring 105. For a given position of lever 109, there corresponds a definite tension of spring 105 and, in consequence, a definite value of the engine speed for which the balance is effected.

If, for any reason, the engine speed rises, the force exerted by coupler 93 of the governor on slide valve 53 rises and becomes greater than the opposing force of spring 105. Slide valve 53 is displaced upwardly and brings into action the servo-control so as to produce a decrease in output of the pump. The quantity of fuel supplied to the engine by the pump decreasing, the engine speed decreases and balance is re-established when the engine speed has regained its initial value and slide valve 53 has returned to its neutral position, the force of the centrifugal governor being balanced anew by the opposing force of spring 105.

On the contrary, if the engine speed decreases, the force of the centrifugal governor decreases and slide valve 53 is displaced downwardly, bringing into action the servo-control so as to increase the output of the pump. The increase in the quantity of fuel supplied to the engine gives rise to an increase in the engine speed and balance is re-established when the engine speed has recovered its initial value.

For a given position of lever 109, the servo-control therefore acts so as to keep the engine speed at a constant value which corresponds to said position of lever 109. If lever 109 is displaced clockwise, spindle 107 is displaced downwardly, further compressing spring 105. Slide valve 53 is displaced downwardly, which gives rise to an increase in output of the pump and an increase in the engine speed, and balance is re-established when the engine speed reaches a new higher value of equilibrium which corresponds to the new position of lever 109. On the contrary, if lever 109 is displaced counterclockwise, the engine speed takes up a new value of equilibrium lower than its initial value.

Thus, lever 109 allows of adjusting the engine speed and to each position of said lever there corresponds a predetermined value of said speed.

The pump illustrated in Fig. 12 differs from the pump illustrated in Fig. 11 in that slide valve 53 of the servo-control, instead of being loaded by the mechanical force of a centrifugal governor, is loaded by the difference in pressure created by a small hydraulic centrifugal turbine.

In the pump illustrated in Fig. 12, a small centrifugal turbine 119 comprises a rotor 111 provided with blades 112 and driven by a shaft 113 having a driving member 114. Driving member 114 is driven by the engine fed by the pump by means of a suitable transmission not illustrated.

The periphery of the centrifugal turbine is connected by a passage 115 with a chamber 116 disposed below slide valve 53, whilst the eye 117 of the centrifugal turbine is connected by a passage 118 to the chamber 103 disposed above slide valve 53. As in the device illustrated in Fig. 11, chamber 103 is connected to the suction collector of the pump by conduit 73, and slide valve 53 is loaded by a spring 105 of which the tension may be adjusted by means of lever 109.

Centrifugal turbine 119 creates, between its periphery and its eye a difference of pressure transmitted to slide valve 53 by passages 115 and 118. Slide valve 53 is loaded by the difference in pressure created by the centrifugal turbine against the action of opposing spring 105. The difference in pressure is proportional to the square of the engine speed, like the centrifugal force of the weights of the governor 120 of the device illustrated in Fig. 11. Centrifugal turbine 119 (Fig. 12) and centrifugal governor (Fig. 11) may be so designed that the difference in pressure created by said centrifugal turbine and acting on slide valve 53 in the device illustrated in Fig. 12 may be equal to the centrifugal force of said centrifugal governor transmitted to slide valve 53 in the device illustrated in Fig. 11. The operation of the two devices is therefore identical.

The examples given above of different methods of controlling the servo-control of the pump which is the principal object of the invention will allow a technician skilled in the art easily to adapt said control to other applications which may arise, without thereby departing from the ambit of the invention.

Similarly, the invention is not confined to a particular form of embodiment of the servo-control. By way of example, there has been illustrated in Fig. 13 a modification of embodiment of the pump illustrated in Fig. 9 which differs therefrom in certain details of the servo-control.

In the pump illustrated in Fig. 13, the pilot member of the servo-control is formed by a piston 121 sliding in a cylinder 122. The suction pressure and the delivery pressure of the pump, instead of acting directly on the slide valve forming the pilot member of the servo-control, acts on the two faces of a movable partition formed by a diaphragm 123 connected to piston 121 and mounted between the body of the apparatus and a cover 129. Diaphragm 123 separates two chambers 124 and 125. Chamber 124 is connected to the suction collector of the pump through a passage 126 and conduit 73, and chamber 125 is connected to the delivery collector of the pump by a passage 127 and conduit 71. Diaphragm 123 is loaded by a spring 128 comprised between said diaphragm and a cupola or cap 130 carried by a rod 131 screwed into the cover 129 and allowing of adjusting the tension of spring 128.

A chamber 132, which plays the same part as recess 55 of slide valve 53 (Fig. 9), communicates permanently with pressure chambers 36a and 36b through passage 57, intermediate conduit 58 and orifices 59a and 59b of small cross-section. Chamber 132 communicates, furthermore, permanently through a pressure passage 133 and an orifie 134 of small cross-section with conduit 71 connected to the delivery collector of the pump. Chamber 132 communicates finally with conduit 73 and the suction collector of the pump through a discharge passage 135 adjusted by piston 121.

The by-passes of the pump are formed by cylindrical housings 136a and 136b disposed opposite to the zones of penetration of the teeth of pinions 7 and 8a on the one hand and 7 and 8b on the other hand, and the section of passage of said by-passes is adjusted respectively by pistons 137a and 137b sliding in cylindrical housings 136a and 136b.

The motive members of the servo-control are constituted by pistons 138a and 138b sliding respectively in cylinders 139a and 139b. Each piston 137 and the corresponding piston 138 of the servo-control are integral, which allows of reducing the total length of guidance of the whole of two pistons, but said pistons may be formed as two distinct members and be simply kept in contact with each other or else connected in any suitable manner. Each of the pistons should then have a sufficient length of guide.

Annular chamber 140 comprised between each of cylinders 139 and the corresponding piston 137 communicates with the suction pressure of the pump through a passage 141 connected to conduit 81 which itself communicates with a conduit 73 connected to the suction collector of the pump.

Pistons 138a and 138b have a smaller diameter than pistons 137a and 137b. The pressure in pressure chambers 36a and 36b which balances the pressure exerted in the by-passes under pistons 137a and 137b is therefore greater in the device illustrated in Fig. 13 than in the device illustrated in Fig. 9.

In the pump illustrated in Fig. 13 as in the pumps previously described, the servo-control may employ as motive fluid another fluid than the liquid under pressure supplied by the pump. By giving different diameter to pistons 137 adjusting the by-passes of the pump and to pistons 138 forming the motive members of the servo-control, there may be employed as motive fluid in the servo-control a fluid of which the pressure is lower than the delivery pressure of the pump, on condition of giving suitable diameters to said pistons, and, if necessary, of giving to pistons 138 a diameter larger than the diameter of pistons 137.

Each piston 138 may be replaced by a diaphragm attached to pistons 137 corresponding thereto and forming a movable partition between pressure chamber 36 and chamber 140, to which a suitable diameter is then given.

Piston 121 which forms the pilot member of the servo-control being in a definite position, a small flow takes place from conduit 71 fed by the delivery collector of the pump towards conduit 73 connected to the suction collector of the pump, through small calibrated orifice 134, passage 133, chamber 132 and passage 135. The pressure in chamber 132 is intermediate between the delivery pressure and the suction pressure of the pump. It decreases when piston 121 is displaced upwardly so as to further uncover discharge passage 135, and it increases when said piston is displaced downwardly so as further to close said passage.

When the servo-control is in equilibrium, the pressure in pressure chambers 36a and 36b is the same as in chamber 132. The said pressure acting on pistons 138a and 138b balances the pressure prevailing in the by-passes of the pump and exerted under pistons 137a and 137b. The difference in pressure between delivery and suction of the pump, transmitted to diaphragm 123, substantially balances the force of spring 128 or, more precisely, the delivery pressure of the pump acting on the lower face of diaphragm 123, increased by the pressure in chamber 132 acting on the lower end of piston 121, is balanced by the suction pressure of the pump acting on the upper face of diaphragm 123, increased by the force of spring 128.

If, for any reason, the delivery pressure of the pump increases, said pressure pushes diaphragm 123 upwardly against the force of spring 128 and piston 121 is displaced upwardly further opening discharge passage 135. The pressure in chamber 132 and in chambers 36a and 36b falls and the pressure exerted under pistons 137a and 137b pushes pistons 137a, 138a, and 137b, 138b, leftward. The section of passage of the by-passes of the pump, adjusted by pistons 137a and 137b, increases and the output of the pump decreases, giving rise to a decrease in delivery pressure. Equilibrium is re-established when the delivery pressure of the pump has been brought back to its original value.

On the contrary, if the delivery pressure of the pump decreases, diaphragm 123 and piston 121 are displaced downwardly so as further to close discharge passage 135. The pressure in chamber 132 and in chambers 36a and 36b increases and pistons 137a, 138a, and 137b, 138b are displaced towards the right so as to increase the output and the delivery pressure of the pump. Equilibrium is re-established when the delivery pressure of the pump has regained its initial value.

The servo-control illustrated in Fig. 13 therefore acts so as to keep substantially constant the delivery pressure of the pump or, more precisely, the difference in pressure between the delivery and the suction of the pump.

In the device illustrated in Fig. 13 as in the devices illustrated in Figs. 6 to 9, the reference pressure relative to which the delivery pressure of the pump is kept substantially constant may be a pressure other than the suction pressure of the pump. To this end it will suffice to omit the communication between passage 126 and conduit 73 and to connect said 126 to the chosen reference pressure. If, for example, the pump feeds with fuel an internal combustion engine and there is chosen as reference pressure the induction pressure of said engine, passage 126 will have to be connected to said induction pressure.

In the servo-controls illustrated in Figs. 8 to 13, pressure chambers 36a and 36b are connected to a pressure passage and to a discharge passage, and the function of the pilot member of the servo-control is to modify the pressure transmitted to said pressure chambers in order to cause a movement of the motive members of the servo-control (pistons 29, Figs. 8 to 12, or piston 138, Fig. 13).

In the servo-controls illustrated in Figs. 8 to 12, the pilot member (slide valve 53) in its neutral position closes simultaneously the pressure passage and the discharge passage and, in its displacements starting from the neutral position, it opens one or other of said passages. The pressure passage and the discharge passage may be so disposed that, in the neutral position of the pilot member, said passages may be only partly closed; the movement of the pilot member starting from its neutral position will then have for effect to increase the section of one of said passages and to reduce the section of the other passages or conversely. In the servo-control illustrated in Fig. 13, the pressure passage has a fixed cross-section (orifice 134) and the pilot member (piston 121) only adjusts the section of the discharge passage. Conversely, the discharge passage might have a fixed cross-section and the pilot member would then adjust only the section of the pressure passage. These are modifications in detail which are well-known to those versed in the art.

Fig. 14 illustrates a modification of detail common to the various pumps illustrated in Figs. 7 to 12.

According to this modification, with cylindrical housing 28a forming a by-pass adjusted by piston 29a, there is associated a similar cylindrical housing 142a disposed on the other side of pinions 7 and 8a and forming a second by-pass adjusted by a piston 143a. The base 144a of cylindrical housing 142a constitutes a pressure chamber like chamber 36a and plays the same part for piston 143a as chamber 36a for piston 29a. In the drawing, only cylinder 142a and piston 143a associated with cylinder 28a and with piston 29a have been illustrated, but a cylinder 142b and a piston 143b are similarly associated with cylinder 28b and with piston 29b of the modified pump according to Fig. 14, without its being necessary to illustrate them.

Passage 145a connects pressure chambers 144a and 36a, so that the same pressure prevails in the two said chambers, and the two pistons 143a and 29a take up symmetrical positions of equilibrium.

As has been explained above, the width e of the pinions of the pump in general is large in order to increase the output of the pump, which is proportional to the width of the pinion. By arranging, as illustrated in Fig. 14, two by-passes symmetrically disposed on both sides of the zone of penetration of the teeth of the pinions of the pump, the expulsion of the liquid between the teeth of the pinions in this zone is facilitated, since this expulsion takes place on both sides of the pinions instead of taking place on one side only as illustrated in the preceding figures. The operation of the pump is thereby improved.

In the drawing, pumps with three pinions have been illustrated, but it is quite evident that the invention is applicable to pumps provided with more than three pinions, wherein a master pinion engages with more than two secondary pinions, each pair formed by the master pinion and one of the secondary pinions forming a pump element of which the output is adjusted in accordance with the invention.

I claim:

1. A gear pump, which comprises, in combination, a casing, a pair of toothed pinions in engagement in said casing, means for driving one of said pinions, a side wall for said casing on each side of said pinions, a suction chamber in said casing on one side of the zone of penetration of the teeth of said pinions, an inlet for said suction chamber, a delivery chamber in said casing on the other side of the zone of penetration of the teeth of said pinions, an outlet for said delivery chamber, a cylindrical housing disposed in one of said side walls and opening into said casing opposite to the zone of penetration of the teeth of said pinions, said cylindrical housing forming a by-pass between said delivery chamber and said suction chamber, a piston sliding in said cylindrical housing, hydraulic servo-control means for adjusting the position of said piston so as to vary the cross-section of said by-pass; said hydraulic servo-control means including a pressure chamber, a movable wall for said pressure chamber operatively connected with said piston, a pressure conduit for connection with a source of fluid under pressure, a discharge conduit, two passages for connecting said pressure chamber respectively to said pressure conduit and to said discharge conduit, and a pilot member controlling at least one of said passages; and a shock-absorbing device including a shock-absorbing chamber connected to said pressure chamber, a movable partition for said shock-absorbing chamber, and a spring loading said movable partition.

2. A gear pump, which comprises, in combination: a casing; a master toothed pinion in said casing, means for driving said master pinion; a plurality of secondary toothed pinions in said casing, in engagement with said master pinion; a side wall for said casing on each side of said pinions; each secondary pinion forming with said master pinion an elementary pump including a suction chamber in said casing on one side of the zone of penetration of the teeth of said pinions, a delivery chamber in said casing on the other side of said zone of penetration, a cylindrical housing disposed in one of said side walls and opening into said casing opposite to said zone of penetration, said cylindrical housing forming a by-pass between said delivery chamber and said suction chamber, and a piston sliding in said cylindrical housing; an inlet collector connected to all said suction chambers; a delivery collector connected to all said delivery chambers; and hydraulic servo-control means for adjusting the position of all said pistons so as to vary the cross-section of said by-passes.

3. A gear pump, which comprises, in combination, a casing, a pair of toothed pinions in engagement in said casing, means for driving one of said pinions, a side wall for said casing on each side of said pinions, a suction chamber in said casing on one side of the zone of penetration of the teeth of said pinions, an inlet for said suction chamber, a delivery chamber in said casing on the other side of the zone of penetration of the teeth of said pinions, an outlet for said delivery chamber, a cylindrical housing disposed in each of said side walls and opening into said casing opposite to said zone of penetration, said cylindrical housings, forming by-passes between said delivery chamber and said suction chamber, a piston sliding in each of said cylindrical housings, and hydraulic servo-control means for adjusting the position of said pistons so as to vary the cross-section of said by-passes.

References Cited in the file of this patent

UNITED STATES PATENTS

| | | |
|---|---|---|
| 1,285,819 | Smith | Nov. 26, 1918 |
| 1,602,740 | Bechler | Oct. 12, 1926 |
| 1,603,395 | Mohl | Oct. 19, 1926 |
| 1,694,805 | Wiltse | Dec. 11, 1928 |
| 1,816,508 | Wilsey | July 28, 1931 |
| 1,853,430 | Jensen | Apr. 12, 1932 |
| 1,879,219 | Harbison | Sept. 27, 1932 |
| 2,065,912 | Straude | Dec. 29, 1936 |
| 2,210,152 | Sacha | Aug. 6, 1940 |
| 2,272,309 | Mott | Feb. 10, 1942 |
| 2,405,061 | Shaw | July 30, 1946 |
| 2,434,135 | Witchger | Jan. 6, 1948 |
| 2,437,791 | Roth et al. | Mar. 16, 1948 |
| 2,505,191 | Lauck | Apr. 25, 1950 |
| 2,526,830 | Purcell | Oct. 24, 1950 |
| 2,549,241 | Rorive | Apr. 17, 1951 |
| 2,604,756 | Greenland | July 29, 1952 |
| 2,622,534 | Johnson | Dec. 23, 1952 |
| 2,639,672 | Johnson | May 26, 1953 |
| 2,642,001 | Dale et al. | June 16, 1953 |
| 2,713,244 | Chandler | July 19, 1955 |
| 2,756,810 | Simmons | July 31, 1956 |